United States Patent [19]

Schifrine

[11] 3,946,388

[45] Mar. 23, 1976

[54] SYSTEM FOR AND METHOD OF ANALYZING ELECTROMAGNETIC WAVES

[75] Inventor: Jean Schifrine, Vaucresson, France

[73] Assignee: Electronique Marcel Dassault, Paris, France

[22] Filed: Apr. 17, 1973

[21] Appl. No.: 352,081

Related U.S. Application Data

[63] Continuation-in-part of Ser. No. 79,744, Oct. 12, 1970, abandoned.

[30] Foreign Application Priority Data

Oct. 13, 1969  France .............................. 69.34986
Oct. 20, 1969  France .............................. 69.35941

[52] U.S. Cl. ............. 343/113 R; 343/5 R; 343/6 R
[51] Int. Cl.² .......................................... G01S 5/02
[58] Field of Search ....... 343/5 R, 6 R, 113; 333/30, 333/30 R; 340/16 R

[56] References Cited
UNITED STATES PATENTS

| | | | |
|---|---|---|---|
| 2,898,589 | 8/1959 | Abbott .............................. | 340/6 R |
| 3,037,185 | 5/1962 | Dewitz ............................. | 340/16 R |
| 3,239,799 | 3/1966 | Boucheron, Jr. .................. | 340/8 L |
| 3,278,891 | 10/1966 | Cowdery .......................... | 340/6 M |
| 3,568,102 | 3/1971 | Tseng .............................. | 333/30 R |
| 3,697,899 | 10/1972 | Dias ................................ | 333/72 |
| 3,766,496 | 10/1973 | Whitehouse ...................... | 333/30 R |

Primary Examiner—Maynard R. Wilbur
Assistant Examiner—T. M. Blum
Attorney, Agent, or Firm—Karl F. Ross; Herbert Dubno

[57] ABSTRACT

A high-frequency wave, e.g. from a target reflecting transmitted radar signals, arrives with different phasing at a plurality of spaced-apart receivers or at a single receiver movable with reference to the signal source. The wave components thus received are fed directly to an array of electromechanical input transducers on the entrance side of a piezoelectric crystal, or are transmitted to respective storage elements which temporarily register information of their phasing to modulate a local oscillation delivered to these input transducers, whereby micro-acoustic vibrations are generated in the crystal with a phase relationship corresponding to that of the original wave components. The acoustic waves in the crystal converge, possibly with the aid of an internal or external focusing surface, on the exit side of the crystal to excite one of a multiplicity of mechanoelectrical output transducers producing a signal indicative of that phase relationship. The system can be used to measure angle of incidence, relative radial velocity, source distance, or the harmonics content of the wave to be analyzed.

15 Claims, 16 Drawing Figures

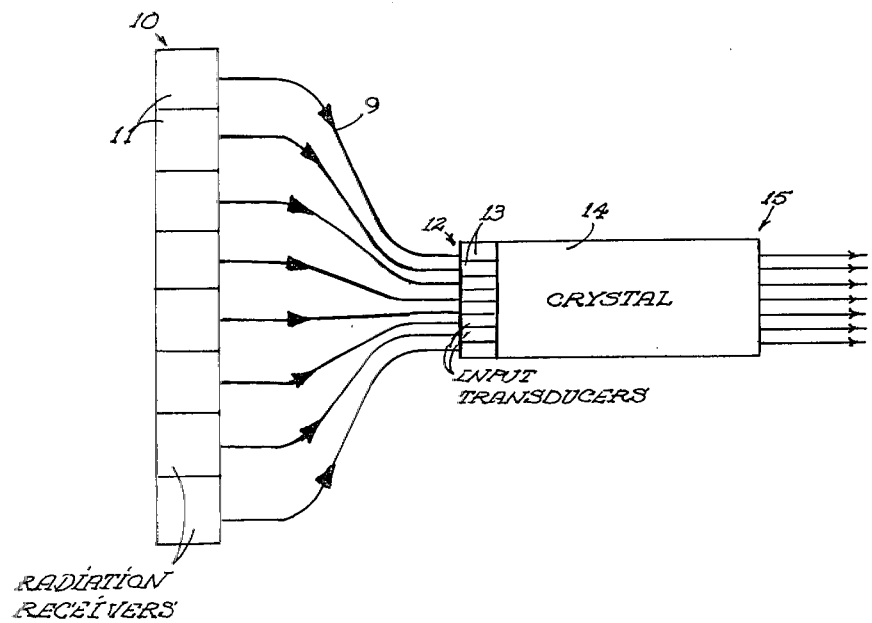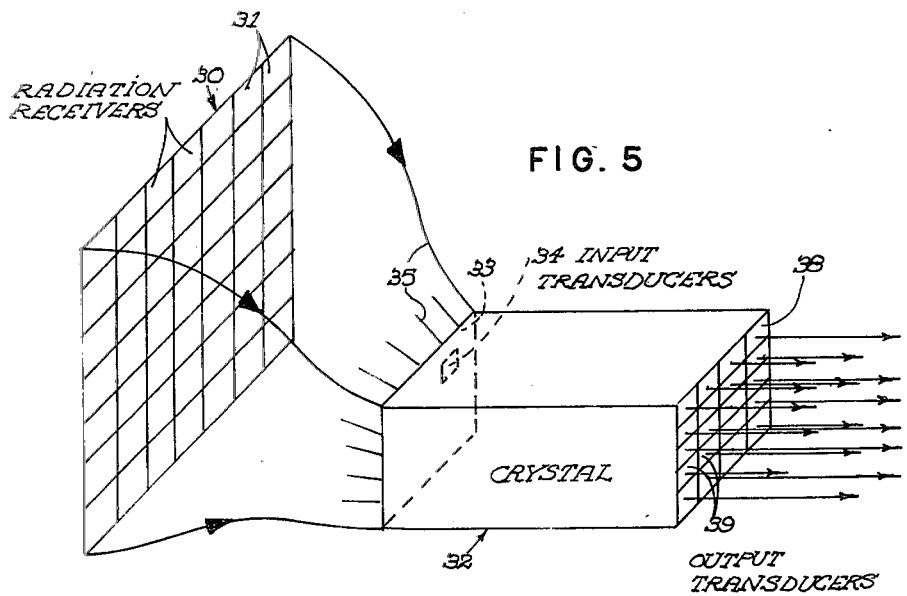

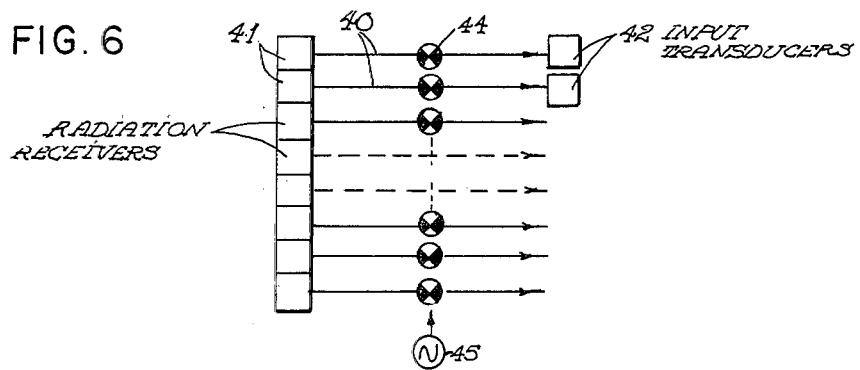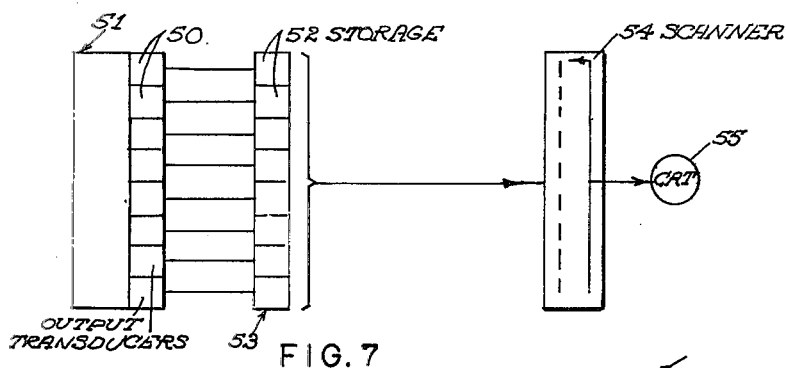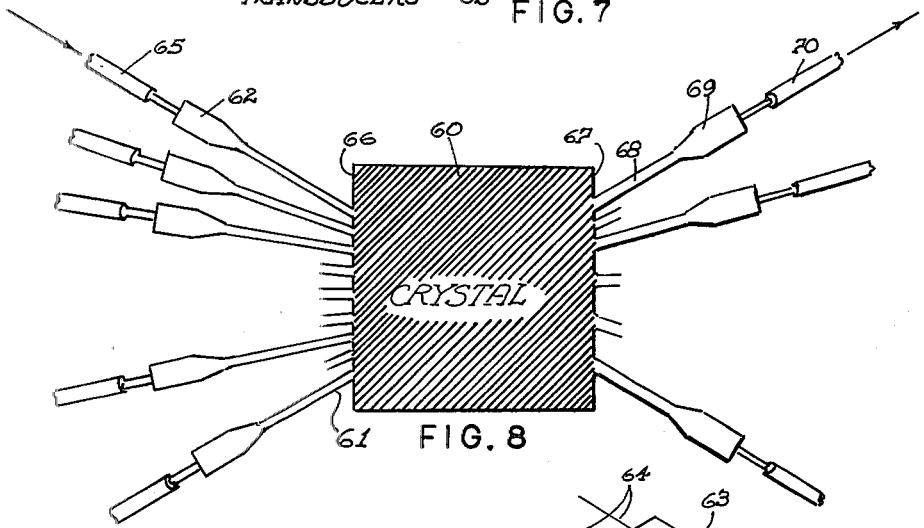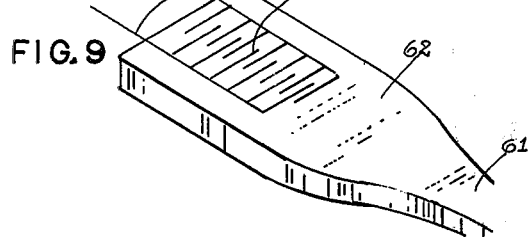

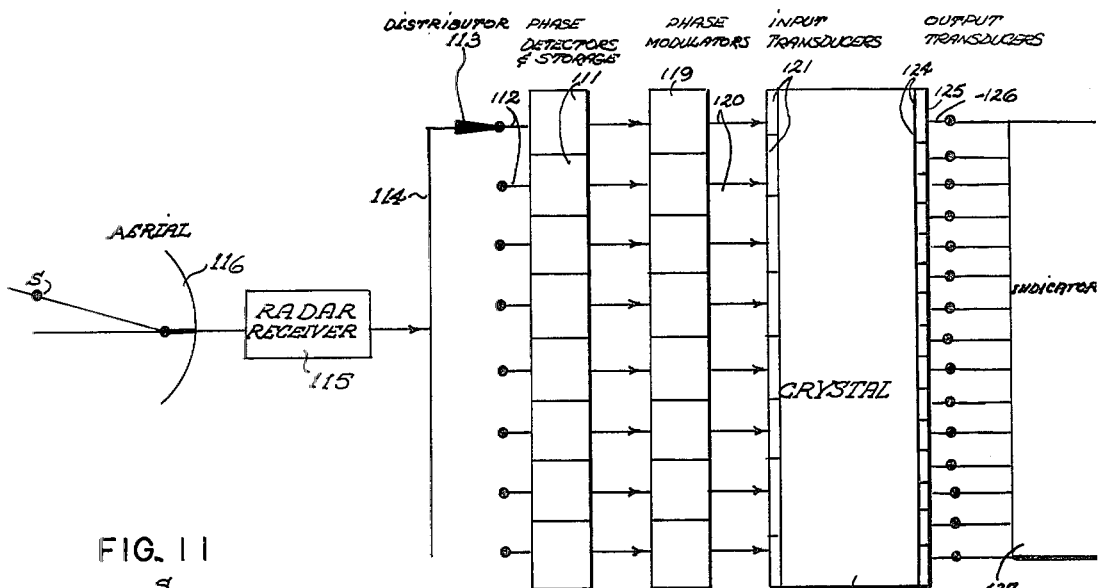
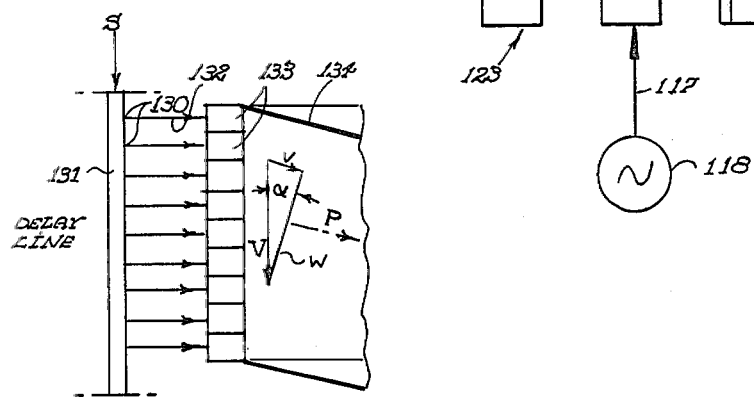
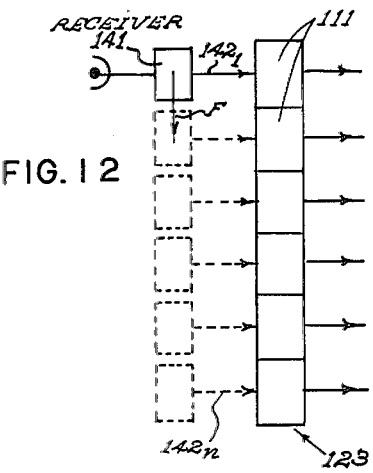
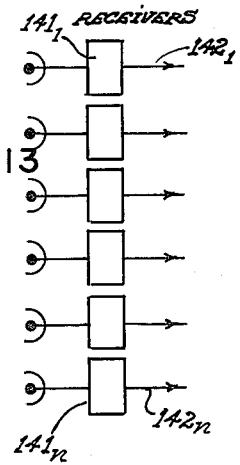

SYSTEM FOR AND METHOD OF ANALYZING ELECTROMAGNETIC WAVES

CROSS-REFERENCE TO COPENDING APPLICATION

This application is a continuation-in-part of my copending application Ser. No. 79,744 filed Oct. 12, 1970 and now abandoned.

FIELD OF THE INVENTION

My present invention relates to a system for and a method of analyzing electromagnetic waves, especially for the purpose of obtaining information on the position or the radial velocity of a source of electromagnetic radiation emitting or reflecting such waves.

BACKGROUND OF THE INVENTION

Electromagnetic radiation generated by or reflected from a virtual point source in space arrives with different phasing at an array of spatially separated receivers, assuming that reception occurs simultaneously throughout the array, or at a single receiver at successive instants if there is relative motion between that receiver and the source. These phase differences can therefore be utilized to pinpoint the location of the source or to ascertain the speed and direction of its relative radial motion.

OBJECTS OF THE INVENTION

The general object of my present invention is to provide simple and highly compact means for analyzing high-frequency electromagnetic signals, particularly as part of a system designed to obtain positional or kinetic information on an active or passive radiation source, without the need for complex logical circuitry, as well as a convenient method of performing such analysis.

A more specific object is to provide a radar installation utilizing such a system.

SUMMARY OF THE INVENTION

A system according to my invention comprises at least one vibration-transmissive solid body, more particularly a piezoelectric crystal, having an entrance side provided with an array of separate electromechanical input transducers and having an exit side, remote from the entrance side, provided with an array of mutually independent mechanoelectrical output transducers, the multiplicity of input transducers being individually connected to respective receivers of electromagnetic waves or being sequentially connectable to one such receiver for energization with electromagnetic waves to be analyzed. These input transducers thereupon mechanically generate, on the entrance side of the solid body, localized acoustic vibrations whose relative phases correspond to those of the received wave components and combine on the exit side to excite the multiplicity of output transducers in a pattern determined by the phasing of these components. If these wave components are high-frequency signals (continuous waves or pulse trains) arriving at respective radiation receivers from a remote source, the predominant excitation of a particular output transducer conveys information on the mean angle of incidence of the incoming radiation and therefore on the position of the source relative to the receiver array. If the wave components are samples of incoming radiation successively intercepted by a single receiver, such excitation indicates the magnitude and sign of the radial velocity of the source with reference to the receiver, provided the sampling is carried out at the basic signal frequency (or at a subharmonic of that frequency) so that the phase change of successive samples is a function of the Doppler shift. In a radar system in which the incoming radiation is the echo of a pulsed or otherwise modulated carrier wave transmitted into space, the basic signal frequency is the repetition frequency or cadence of the pulses or more generally the modulating frequency. If the modulating signal is a sawtooth wave, the amplitude of an incoming sample is directly related to its phase.

A system according to my invention also enables a different type of analysis of electromagnetic signals, namely the evaluation of the harmonics content of a wave, if the input transducers are energized from different taps of a delay network or line along which the various frequency components are propagated with different velocities. Since the phase shifts undergone by different harmonics are analogous to the relative phasing of signal components arriving at an array of radiation receivers with different mean angles of incidence, the several harmonics will tend to excite different output transducers as though they arrived from different directions.

Since the wavelength of the acoustic vibrations in the crystalline body is extremely short, e.g. on the order of 1 micron, it constitutes a small fraction of the free-space signal wavelength so that even a crystal of small dimensions will provide transmission paths whose extent, in terms of the vibration wavelength, is comparable to that of the path of the incoming radiation in terms of its free-space signal wavelength. In the case of a system designed to pinpoint a source located approximately at a predetermined distance from the receiver array, with the extent of the array a substantial fraction of that distance, it is therefore possible to proportion the crystal in such a way that the vibrations generated at the entrance side converge substantially in a point at the exit side, thereby focusing the image of the source on a specific output transducer. If the source distance is unknown or variable, the array of output transducers may be divided into a multiplicity of sets disposed in zones with staggered spacing from the entrance side; the crystal structure may then consist of a single, stepped or beveled body or of a plurality of juxtaposed laminar bodies of different length in the direction of vibration transmission. The excitation of a transducer in a particular set then indicates the source distance.

If the source distance is very great, the vibrations propagating within the crystal structure will have a substantially planar wavefront. In such a case it will be advantageous to include reflective or refractive focusing means in that structure, as by providing it with a reflecting outer surface or with one or more arcuate internal boundaries between body constituents of different transmissivity. Such focusing means will also be useful in systems designed to detect Doppler shifts or to provide a Fourier analysis of the harmonics content of the incoming signal.

In order to reduce or eliminate the dependency of the vibration frequency upon the signal frequency, I may change the frequency of the incoming wave components with the aid of a set of mixers interposed in the feed circuits of the several input transducers. In a velocity-measuring system, in which these transducers are to be simultaneously energized with phase differences corresponding to those of successive radiation samples, these feed circuits may include phase modulators for a local oscillation of fixed frequency which are controlled by phase data stored in respective memory stages during a sampling period. Memories suitable for the storage of phase information in digital form, with an analog read-out adapted to control such phase modulators, are known for example from U.S. Pat. No. 3,584,295. Such storage means can also be used in the case of angle measurements to allow the use of a single, moving receiver.

The electric signals derived by the output transducers from the acoustic vibrations can be translated into a visual indication of angle of incidence, source distance, relative velocity or harmonics content by conventional display means such as a cathode-ray tube whose scanning circuit samples these output transducers in the course of a sweep cycle. The location of an excited transducer (or a small cluster of excited transducers) in its array can then be indicated on the CRT screen by a sharp deflection of the beam trace from a base line; the screen may then be calibrated along this base line, e.g. in terms of azimuth angle, to give a direct reading of the source position. In the case of two-dimensional arrays of input and output transducers, intended to measure both azimuth and elevation or either of these parameters together with distance, the beam may also be deflected in two dimensions by line and frame scanning and may be brightened at points corresponding to excited transducers; in that case the screen may be provided with a suitably calibrated grid.

BRIEF DESCRIPTION OF THE DRAWING

The above and other features of my invention will now be described in detail with reference to the accompanying drawing in which:

FIG. 4 is a diagram similar to that of FIG. 2, showing a modification;

FIG. 5 is a perspective view of a system similar to that of FIG. 4, expanded into two dimensions;

FIG. 6 is a diagrammatic detail view of a modified input stage for a system according to my invention;

FIG. 7 is a diagrammatic detail view of an output stage for a system according to my invention;

FIG. 8 is a prespective view, partly in section, of a module comprising a vibration-transmitting crystal provided with integral arrays of input and output transducers;

FIG. 9 is a perspective view, partly diagrammatic, of an input transducer forming part of the module of FIG. 8;

FIG. 10 is an overall diagram generally similar to that of FIG. 2 but representing a system designed to detect relative motion;

FIG. 11 is a fragmentary view of a system for the Fourier analysis of a wave shape;

FIG. 12 is a fragmentary view of a modified source-locating system;

FIG. 13 is a diagram of an equivalent input stage for the system of FIG. 12;

SPECIFIC DESCRIPTION

Figure 1:
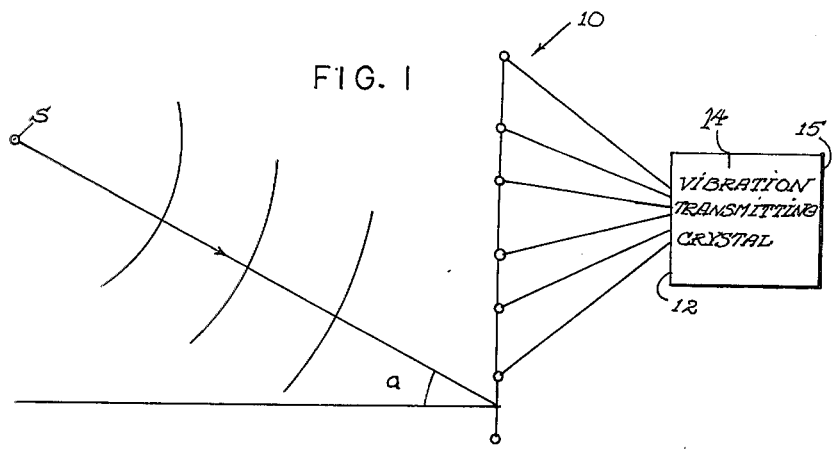
FIG. 1 is a highly schematic view of a system according to my invention, used for locating a source of radiation.

In FIG. 1 I have shown a point or quasi-point source S of electromagnetic radiation such as, for example, a target reflecting pulses or continuous electromagnetic waves emitted by a radar aerial. However, this source could also be a radiation emitter such as a radiometric signal generator, a radar detector or a homing head of a missile. The radiation coming from source S is picked up by a receiving stage 10 comprising, for example, a multiplicity of segments 11 of a radar antenna. These elemental receivers 11 work into a processor 14 essentially consisting of a vibration-transmitting crystal, this processor having an entrance side 12 and an exit side 15.

Figure 2:
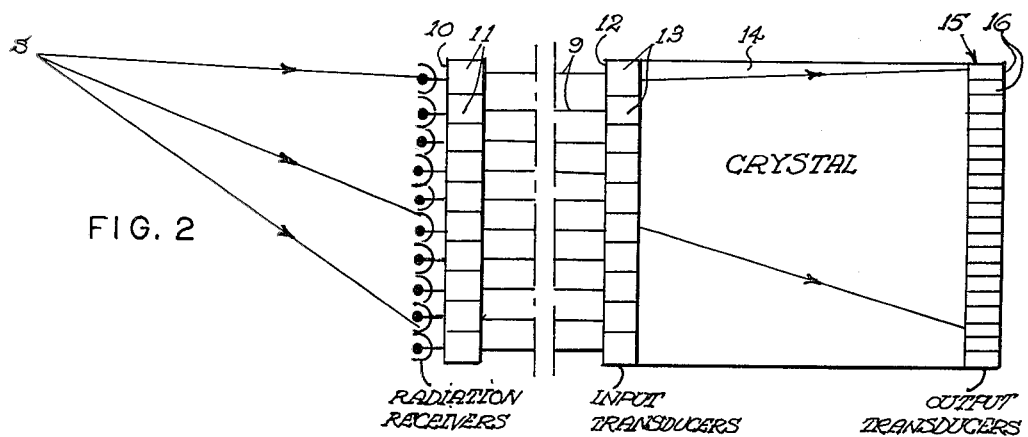
FIG. 2 is a more detailed diagram of the constituents of the system of FIG. 1, including a vibration-transmitting crystal.

As more fully illustrated in FIG. 2, the entrance side 12 of the crystal body 14 is provided with a multiplicity of electromechanical transducers 13 individually connected via respective leads 9 to corresponding radiation receivers 11, these receivers and the input transducers 13 thus constituting two homothetic arrays. Transducers 13 convert the incoming electrical oscillations into mechanical vibrations of the same frequency which are acoustically transmitted to an array of mechanoelectrical output transducers 16 on the exit side 15 for reconversion into electrical signals. Crystal body 14 may consist of a material capable of conducting high-frequency vibrations (up to several tens of MHz), e.g. ruby or garnet, and may be a relatively thin layer with a thickness dimension in the direction perpendicular to the plane of FIG. 2 (cf. FIG. 15, layers $159_1 - 159_k$). The propagation velocity of the vibrations through this body may be on the order of $10^{-5}$ times that of the free-space propagation velocity of the electromagnetic radiation.

The several output transducers 16 could work into individual indicators designed to give a reading of their respective signal strengths, the mean angle of incidence of the incoming radiation (and therefore the azimuth or elevation of the source S) being determined by the position of the output transducer whose indicator shows the highest reading. Alternatively, as illustrated in FIG. 7 discussed below, the transducer outputs could also be sampled by a scanner in the sweep circuit of an oscilloscope displaying the location of the source on its screen.

Figure 3:
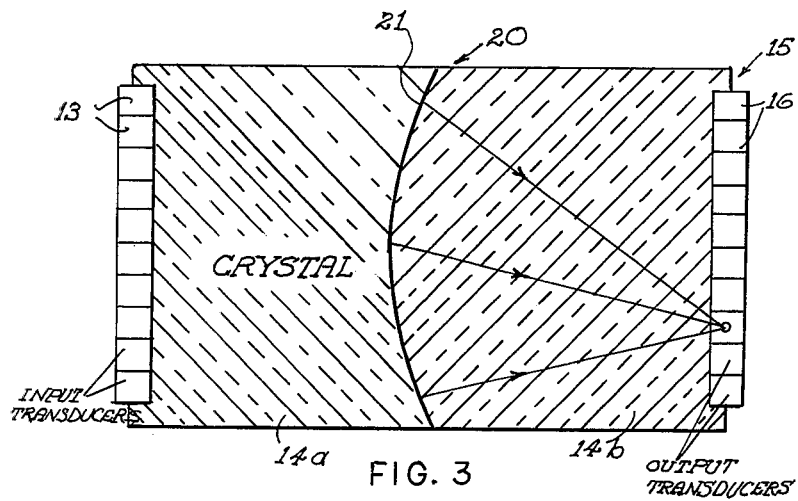
FIG. 3 is a cross-sectional view of a similar crystal provided with focusing means.
Figure 14:
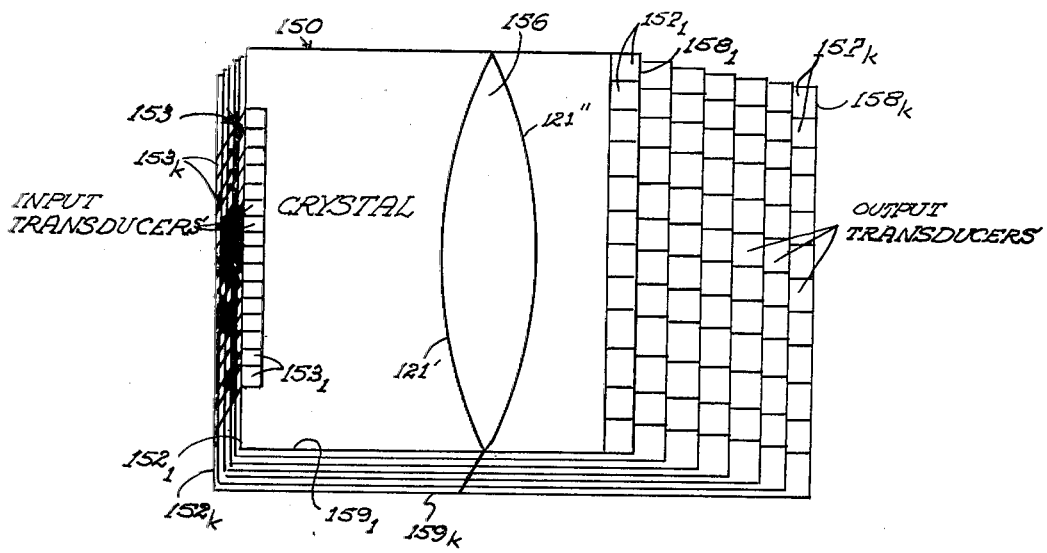
FIG. 14 is a perspective view of a vibration-transmitting structure including a stack of laminar crystals of different length.
Figure 15:
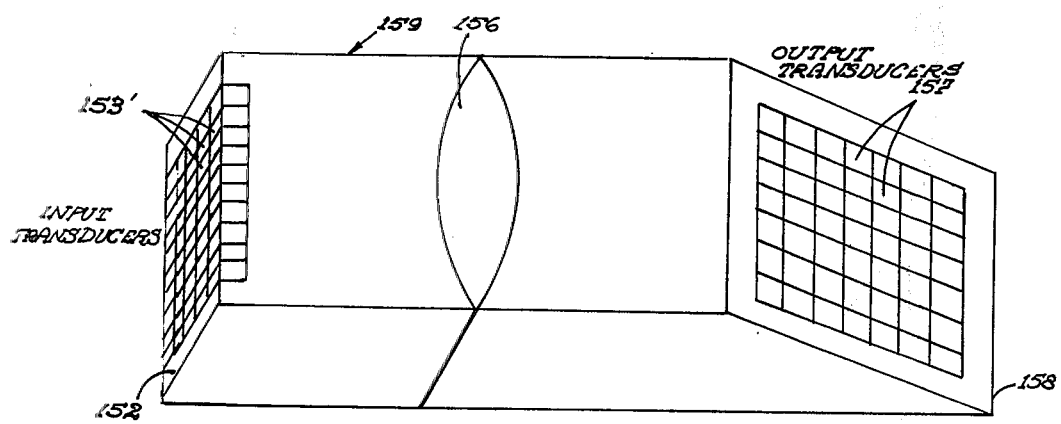
FIG. 15 is a view similar to FIG. 14, showing a modified structure.

If the source S is far away, the vibrations excited by the input transducers 13 on the entrance side 12 of the crystal will give rise to a more or less planar wavefront propagating in a direction related to the angle of incidence. In order to indicate that angle by the means described, it is necessary to convert this substantially planar wavefront into a converging wavefront so as to focus the vibratory energy upon an individual output transducer. For this purpose, as shown in FIG. 3, the unitary crystal body 14 of FIG. 2 may be replaced by a composite body 20 consisting of two crystalline parts 14a and 14b of different propagation velocities, these parts being joined together at a cylindrically curved boundary 21. Thus, for example, crystal portion 14a may be made of a material of lower density, such as garnet, whereas portion 14b consists of a material of higher density, such as ruby. A like focusing effect may be had by interchanging these relative densities and inverting the curvature of boundary 21. In fact, as shown in FIGS. 14 and 15, the single cylindrical surface 21 may be replaced by a pair of such surfaces 121', 121'' forming a cylindrical lens 156, with the lens material between these boundaries having the greater density.

Figure 16:
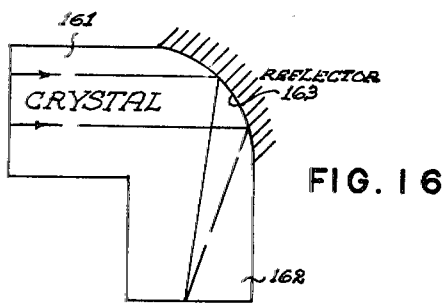
FIG. 16 is a diagrammatic view of a crystal provided with alternate focusing means.

Alternate focusing means, as shown in FIG. 16, may comprise a reflective outer surface 163 of a crystal body 160 having an entrance portion 161 and an exit portion 162. The cylindrical curvature of surface 163 concentrates the substantially parallel acoustic waves within entrance portion 161 into converging waves within exit portion 162.

The homothetic arrays of radiation receivers 11 and input transducers 13 need not be physically coextensive. Thus, as shown in FIG. 4, the transducers 13 may be considerably more closely spaced than the receivers 11, with resulting reduction in the dimensions of the associated crystal body 14. Also, the spacing of the output transducers is unrelated to that of the input transducers.

If the direction of the radiation source is to be ascertained in two orthogonal planes, as in azimuth and in elevation, a two-dimensional array of radiation receivers 31 may be used in a receiving station 30 as shown in FIG. 5. An associated crystal body 32 is provided at its entrance side 33 with a multiplicity of input transducers 34 linked with respective receivers 31 by connections 35, the transducers 34 being disposed in a two-dimensional array homothetically related to that of the receivers 31. A two-dimensional array of output transducers 39 is disposed on the exit side 38 of body 32. The signals developed by transducers 39 could be displayed on the screen of a cathode-ray tube, after interim storage, in the manner described below with reference to FIG. 7.

As shown in FIG. 6, a set of radiation receivers 41 may work into respective input transducers 42 by way of mixers 44 inserted in their respective transmission lines 40. The mixers 44 receive the output of a local oscillator 45 to generate a beat frequency, lower than the operating frequency of the incoming radiation, which can be more easily converted into mechanical vibrations within the associated crystal body, thus offering a wider choice of materials for that body. Through suitable selection of the modulating frequency emitted by oscillator 45, which for this purpose should be variable, it is also possible to make the excitation frequency for the crystal independent of the radiation frequency.

In FIG. 7 we have illustrated a memory 53 with a multiplicity of storage elements 52 individually connected to respective output transducers 50 on the exit side of the crystal body 51. These storage elements register the magnitudes of the signals issuing from the respective output transducers and are periodically sampled by a scanner 54 which controls the vertical deflection of the beam of a cathode-ray tube 55, the beam being horizontally deflected in the rhythm of the scan. If the transducers 50 are arrayed in two dimensions, as shown in FIG. 5, the memory 53 consists of a corresponding two-dimensional matrix of storage elements 52. In that case, scanner 53 may sample these storage elements at a relatively fast rate in one dimension and at a relatively slow rate in the other dimension, in conformity with the line and frame scans of conventional television systems, while deflecting the beam in step with the scan; the sampled signals will then be used to modulate the intensity of the beam. Each storage element 52 may simply comprise a capacitor in series with a discharge resistor.

FIGS. 8 and 9 show a module consisting of a piezoelectric crystal body 60 and associated input and output transducers 62, 69 integral therewith. Input transducers 62 include flattened extremities of extensions 61 of the crystal body, these extremities being excited by signals from respective transmission lines 65 whose conductors 64 have branches 63 disposed in interleaved relationship on their crystalline support. In an analogous manner, not illustrated in detail, output transducers 69 constitute the free ends of crystal extensions 68 and carry the branched conductors of respective transmission lines 70 which lead to associated indicators or to the storage elements 52 shown in FIG. 7.

In FIG. 10 we have illustrated a modified system which uses the same principles as that of the preceding Figures but wherein the source S is assumed to have a radial component of motion with reference to an aerial 116 of a single radar receiver 115. The output circuit 114 of this receiver includes a distributor 113 which periodically, in cyclic succession, transmits the incoming high-frequency signals to inputs 112 of respective storage elements 111 forming part of a memory 123. These storage elements, which may be of the type described in the aforementioned U.S. Pat. No. 3,584,295, register the phase shift of the incoming signals at instants at which this phase shift would be constant if there were no relative motion between the source and the receiver.

Thus, elements 111 may also include respective phase detectors which receive a reference signal of the basic frequency from, for example, a signal generator modulating an outgoing carrier fed to an associated radar transmitter. However, a reference signal will not be needed if the incoming radiation is sawtooth-modulated (in amplitude or in frequency) so that its amplitude, or the amplitude of the output of a frequency discriminator included in the receiver 115, is a linear function of phase. Aside from the possible presence of a phase detector, storage elements 111 may be similar to elements 52 described above. The distributor 113 is stepped once every $m^{th}$ cycle ($m$ being any convenient integer, including 1) of the reference signal.

After the distributor has loaded all the storage elements 111 of memory 123, the phase data registered therein are transmitted simultaneously to similar capacitive storage means in the control inputs of respective modulators 119 receiving a local oscillation of constant frequency from the output 117 of an oscillator 118. This local oscillation, modulated in phase under the control of the stored data, is then transmitted via conductors 120 to an array of input transducers 121 of a crystal body 122. The direction of propagation of the resulting wavefront inside this body is a function of both the magnitude and the sign of the Doppler shift due to the radial velocity component; if that velocity component is zero, the vibratory energy is transmitted perpendicularly to the end faces of that body to an array of output transducers 124 on its exit side 125, impinging upon the middle transducer if focused within the body as described above. The output signals of transducers 124 are transmitted via leads 126 to an indicator stage 127 which may again consist of individual indicators or of a common display device. FIG. 11 shows part of a system according to my invention designed to perform a Fourier analysis of an incoming signal $s$, transmitted along a delay line 131 having several taps 130 connected via leads 132 to respective input transducers 133 of a crystal body 134. If the phase velocity of a particular signal frequency along delay line 131 is V and the vibrations travel through the body 134 with a velocity $v$, the resulting wavefront $w$ will include an angle $\alpha$ with a line parallel to the input array 133, with $\alpha = \arcsin v/V$. The angle $\alpha$ is therefore a function of the phase velocity V of each individual harmonic which, it is assumed, varies throughout the band of interest; thus, the direction of propagation $p$ within the crystal is different for each harmonic. With the aid of refractive or reflective focusing means as described above, therefore, the resulting vibration may again be concentrated on an individual output transducer (not shown in FIG. 11). From the known location of the output transducers predominently excited by the vibrations due to the fundamental frequency of signals $s$ and its second, third, etc. harmonics, a chosen number of terms of the Fournier transform of the signal can be determined by individual measurements of the transducer signals or by an oscilloscopic display.

In the case of a substantially stationary radiation source of known signal frequency, the location of that source can also be determined with the aid of a single radiation receiver 141 movable through a multiplicity of positions as shown in FIG. 12. In these several positions the receiver 141 energizes the inputs $142_1 - 142_n$ of a set of storage elements 111 of a memory 123 as shown in FIG. 10, working into respective phase modulators and input transducers not illustrated in FIG. 12. The displacement (arrow F) of receiver 141, if carried out in the rhythm of the signal frequency (i.e. one step at every $m^{th}$ cycle), results in a progressive phase shift equivalent to that experienced by wave components from the same source arriving at an array of receivers $141_1 - 141_n$ shown in FIG. 13. As with the system of FIG. 10, stages 111 of memory 123 are periodically sampled (after each series of $n$ steps) to transmit a control signal to their respective phase modulators.

In FIG. 14 we have shown a crystal structure 15 consisting of a stack of laminar crystalline bodies $159_1 - 159_k$ served by respective sets of input transducers $153_1 - 153_k$ which lie in a common plane on the entrance sides $152_1 - 152_k$ of the crystals; corresponding transducers of each array 153 are energized in parallel from respective radiation receivers not shown. Each crystal body $159_1 - 159_k$ contains a focusing lens 156 with boundaries 121', 121'', these lenses being advantageously of identical construction and positioned at the same distance from the entrance side of the structure. The exit side $158_1 - 158_k$ of each body $159_1 - 159_k$ is provided with a respective array of output transducers $157_1 - 157_k$ lying in a zone whose distance from the entrance side increases progressively from body $159_1$ through body $159_k$. The refractive power of each lens 156 should be so chosen that vibrations with a planar wavefront caused by incident radiation from a very remote source are focused upon the most distant transducer array $157_k$. Converging wavefronts, due to radiation from less distant sources, are focused upon the other transducer arrays. Thus, the system of FIG. 14 provides an indication not only of the angle of incidence of incoming radiation but also of the distance of its source. The matrix of output transducers $157_1 - 157_k$ may be sampled in the same way as that of transducers 39 (FIG. 5) to provide a visual display on an oscilloscope screen which in this case may be graduated in units of distance and degrees azimuth (or elevation).

The laminar stack 150 of FIG. 14 could also be consolidated into a single, stepped body. Alternatively, as shown in FIG. 15, such a solid body 159 may be given a trapezoidal shape with a two-dimensional array of output transducer 157 on its beveled exit face 158 and a row of input transducers 153 on its entrance face 152; a simple focusing lens 156 is formed in that body by throughgoing cylindrical boundaries It will thus be seen that I have provided both a system for a method of analyzing high-frequency electromagnetic waves, such as the radiation from a source S (FIGS. 1, 2, 10) or the signal wave $s$ (FIG. 11), by collecting a multiplicity of wave components differing in phase among one another; mechanically exciting localized high-frequency vibrations at a multiplicity of input points of a solid body such as crystals 14, 122 and 159, the phase relationships of these vibrations corresponding to those of the collected wave components; detecting a resulting vibration peak at an output point of the body, remote from its aforementioned input points, whose location is a function of these phase relationships; and converting this vibration peak into an electrical signal indicative of the location of the corresponding output point.

I claim:

1. A system for analyzing an electromagnetic wave, comprising:

receiving means oriented toward a common source of a wave to be analyzed and adapted to derive therefrom a multiplicity of differently phased wave components;

a vibration-transmissive solid body provided with a multiplicity of electromechanical input transducers arrayed in at least one row along an entrance edge and with a multiplicity of mechanoelectrical output transducers arrayed in at least one row along an exit edge remote from said entrance edge; and circuit means extending from said receiving means to said input transducers for substantially simultaneously energizing the latter with substantially the same frequency and with a phase relationship corresponding to that of said wave components, thereby mechanically generating localized vibrations in said body giving rise at said exit edge to a resultant vibration predominantly exciting an output transducer whose location on said body is a function of said phase relationship.

2. A system as defined in claim 1 wherein said body is a piezoelectric crystal.

3. A system as defined in claim 2 wherein said crystal is ruby.

4. A system as defined in claim 1 wherein said receiving means comprises a multiplicity of individual receivers respectively connected by said circuit means to said input transducers, said radiation receivers and said input transducers being disposed in homothetic arrays.

5. A system as defined in claim 4, further comprising modulating means in said circuit means between said radiation receivers and said input transducers for stepping down the frequency of incident radiation to a vibration frequency transmissible by said body.

6. A system as defined in claim 1 wherein said receiving means comprises a single radiation receiver movable relatively to a source of incident radiation, said circuit means including a multiplicity of memory elements respecitively connected to said inut transducers and distributing means for successively connecting said radiation receiver to said storage elements for storing therein information on the phasing of successively received radiation samples, said circuit means further including a local oscillator and modulating means between said memories and said input transducers connected to said oscillator for deriving therefrom a multiplicity of constant-frequency oscillations relatively modulated in phase according to the information stored in the respective memory elements.

7. A system as defined in claim 1 wherein said body includes focusing means between said entrance and exit sides for directing said localized vibrations in convergent paths toward said output transducers.

8. A system as defined in claim 7 wherein said input transducers are arrayed in a plane on said entrance side, said output transducers being arrayed in a plurality of zones differently spaced from said plane.

9. A system as defined in claim 8 wherein said body is divided into sections of different length each carrying one of said zones.

10. A system as defined in claim 1, further comprising display means connected to said output transducers for indicating the location of an output transducer predominantly excited by said resultant vibration.

11. A system as defined in claim 1 wherein said receiving means comprises delay means for propagating different harmonics of said wave with different phase velocities, said delay means being provided with a multiplicity of taps respectively connected by said circuit means to said input transducers.

12. A system as defined in claim 2 wherein said crystal is garnet.

13. A system as defined in claim 7 wherein said body is divided into portions of different density, said focusing means being formed by a boundary between said portions.

14. A system as defined in claim 13 wherein said portions respectively consist of garnet and ruby.

15. A system as defined in claim 7 wherein said focusing mens is formed by an internally reflecting curved lateral edge of said body.

* * * * *